United States Patent Office 3,274,130
Patented Sept. 20, 1966

3,274,130
PHOSPHORUS POLYURETHANE PLASTICS PREPARED FROM HYDROXYL PHOSPHORUS COMPOUNDS
Gunther Oertel, Cologne-Flittard, Otto Bayer, Leverkusen, and Gunther Braun, Cologne-Flittard, Germany, assignors to Farbenfabriken Bayer Aktiengesellschaft, Leverkusen, Germany, a German corporation
No Drawing. Filed Mar. 22, 1962, Ser. No. 181,782
Claims priority, application Germany, Mar. 29, 1961, F 33,541
5 Claims. (Cl. 260—2.5)

This invention relates to phosphorus compounds and more particularly to high molecular weight phosphorus compounds which are suitable for reaction with organic polyisocyanates to prepare polyurethane plastics and to said polyurethane plastics.

The preparation of hydroxyl phosphorus compounds which may be reacted with organic polyisocyanates has been proposed heretofore. For example, it has been proposed heretofore to react aryloxy phosphoric acid dichlorides with dihydroxy phenols which may in turn be reacted with organic polyisocyanates to prepare polyurethanes. Since the terminal hydroxyl groups are phenolic, the polyurethanes produced from these hydroxyl phosphorus compounds are thermally unstable. Moreover, the transesterification of trialkyl phosphates with polyalcohols has not become commercially important because it is extremely difficult to transesterify the phosphates, and because numerous secondary reactions occur simultaneously.

The purpose of including phosphorus in the polyurethane plastics is to impart some degree of non-flammability thereto. A good way to do this is to use isocyanates which contain phosphorus for reaction with polyhydroxyl compounds in order to obtain the urethanes, but the phosphorus containing isocyanates are only obtainable by multi-stage processes and the use of them is therefore often uneconomical. Still another way of imparting non-flammability to the polyurethanes is to include nonreactive trialkyl phosphites in the reaction mixture leading to the production thereof. The nonreactive trialkyl phosphites tend to exude out of the product. Moreover, the nonreactive phosphoric acid esters of low molecular weight such as trichloro ethyl phosphite lower the mechanical properties of the polyurethane plastics.

It is, therefore, an object of this invention to provide hydroxyl phosphorus compounds and polyurethane plastics prepared therefrom which are easier to prepare and which have improved physical properties. Another object of this invention is to provide improved polyhydroxyl compounds for the preparation of polyurethane plastics which contain phosphorus and nitrogen atoms. Still a further object of this invention is to provide polyhydroxyl compounds containing phosphorus suitable for the production of polyurethane plastics which are difficult to ignite. A further object of this invention is to provide improved polyurethane plastics including cellular polyurethane plastics and non-porous polyurethane plastics which may be castings, moldings, coatings, and the like and a process for the preparation thereof. Still another object of this invention is to provide an improved process for the preparation of hydroxyl phosphorus compounds.

The foregoing objects and others which will become apparent from the following description are accomplished in accordance with the invention, generally speaking, by providing hydroxyl phosphorus compounds containing nitrogen atoms and reaction products thereof with organic polyisocyanates to prepare polyurethane plastics. The hydroxyl phosphorus compounds of the invention which contain nitrogen atoms are preferably obtained by reacting secondary N-hydroxy alkyl aryl amines with a phosphohalide in the presence of an acid binding agent in a first stage and subsequently reacting the product of the first stage with an alkylene oxide. The resulting hydroxyl phosphorus compound preferably has an hydroxyl number within the range of from about 40 to about 800 and a molecular weight of at least about 400 and preferably not more than about 10,000.

Any suitable secondary N-hydroxy alkyl aryl amine may be used but it is preferred to use N-beta-hydroxy ethyl aniline or derivatives thereof which are halogen substituted on the benzene ring such as N-beta-hydroxy ethyl-p-chloro aniline and the like. Suitable compounds have the following formulas:

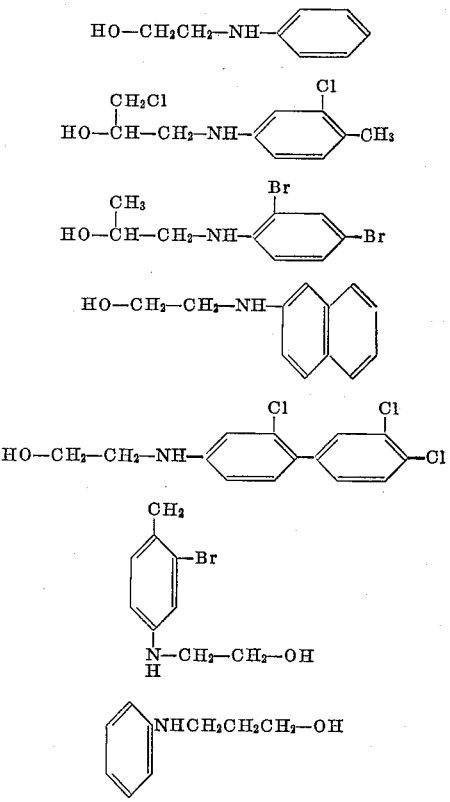

a preferred group of secondary N-hydroxy alkyl aryl amines has the formula:

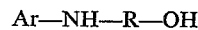

Ar—NH—R—OH wherein Ar is an aromatic radical having one or two benzene rings which may be separate or fused and which may be substituted with lower alkyl radicals such as methyl, ethyl and propyl; halogen such as a bromine, chlorine and the like and R is an alkylene radical having two or three carbon atoms.

Any suitable phosphohalide may be used such as, for example,

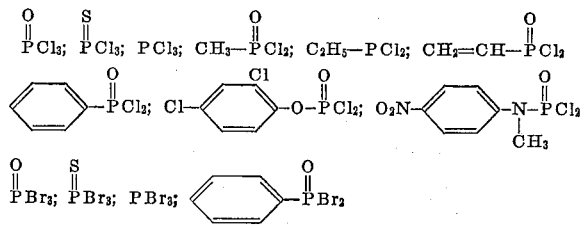

and the like.

Any suitable acid binder may be used in the reaction between the phosphohalide and the N-hydroxy alkyl aryl amine including tertiary amines such as triethyl amine, pyridine, triethylene diamine, N-ethyl morpholine, dimethyl cetyl amine, dimethyl benzyl amine, dimethyl isopropyl amine, diethyl ethanol amine, N-coco morpholine and the like; alkali metal components such as, sodium carbonate, calcium carbonate, potassium carbonate and the like; alkali metal hydroxides such as, sodium hydroxide, potassium hydroxide, calcium hydroxide and the like, but the preferred acid binder is ammonia.

Any suitable alkylene oxide may be used for reaction with the reaction product of the N-hydroxy alkyl aryl amines and phosphohalides such as, for example, propylene oxide, ethylene oxide, 1,2-butylene oxide, 1,3-butylene oxide, 1,2-pentylene oxide, epichlorohydrin, phenoxy propene oxide and the like.

The hydroxyl phosphorus compounds preferably contain more than one hydroxyl group so that they will enter into reaction with an organic polyisocyanate to prepare a polyurethane plastic. The polyhydroxyl phosphorus compounds are prepared in two stages. First, by reacting the phosphohalide with a secondary N-hydroxy alkyl aryl amine in the presence of an acid binding agent. In this first stage, a salt is formed as a secondary product of the reaction from the acid binding agent and the hydrogen halide released in the reaction between the phosphohalide and the N-alkyl aryl amine. This salt can be separated from the product prior to reaction thereof with the alkylene oxide in a second stage or it can be allowed to remain in the product during the reaction with the alkylene oxide and only subsequently separated prior to reaction with the organic polyisocyanate. Some products could conceivably benefit by having the salt remain in the final product. The proportions of N-hydroxy alkyl aryl amine and phosphohalide are preferably adjusted so that there is one hydroxyl group of the N-hydroxy alkyl aryl amine for each phosphorus-halogen bond of the phosphohalide. The secondary N-hydroxy alkyl aryl amine contains both an hydroxyl group and a secondary amino group and these groups both react with the phosphohalides in the presence of an acid binder to yield both N-aryl amino alkoxy esters of phosphorus and N-hydroxy alkyl-N-aryl amides or mixtures thereof. The mixtures of these two types of products are not completely homogeneous but on reaction of these products with alkylene oxides, polyhydroxyl compounds are obtained from both types of products. It is, therefore, not possible to assign with accuracy a chemical formula to all of the products of the present invention since any of a multitude of mixtures may be obtained when beginning with these components. All that is known is that in the reaction product of the initial stage, whether it is an N-aryl amino alkoxy ester of phosphorus or an N-hydroxy alkyl-N-aryl amide or both, that it reacts in a second stage with an alkylene oxide to yield an hydroxyl phosphorus compound which is particularly adapted to the preparation of substantially non-flammable polyurethane plastics. In some way in the second stage, there is effected an oxalkylation of the existing secondary amino groups and of the aliphatic hydroxyl groups so that the desired polyhydroxyl phosphorus compound of the invention is obtained.

The method of carrying out the combination of the various components leading to the production of the hydroxyl phosphorus compound may vary considerably depending on the particular phosphohalides and N-hydroxy alkyl aryl amines which are used, but according to one preferred form of the process, the secondary N-hydroxy alkyl aryl amine is dissolved in an inert organic solvent such as benzene, toluene, chlorobenzene, methylene chloride, petroleum ether, the diethyl ether of diethylene glycol and the like and the phosphohalide is added to the resulting solution slowly while cooling the reaction mixture to maintain the temperature between about 20 and about 100° C. A suspension is formed which is preferably stirred for another 30 minutes or more at a temperature of from about 50 to about 100° C. and then substantially anhydrous ammonia gas, or other acid binding agent, is bubbled through the reaction mixture while maintaining the temperature at about room temperature and preferably at about 20° C. with cooling. A salt, ammonium halide if ammonia was used, is thus separated out in crystalline form and can be easily separated from the balance of the reaction mixture by filtration. The solution is then concentrated, for example, by evaporation, and the residue obtained is generally of an oily consistency which may be reacted without further purification with an alkylene oxide at a temperature between about 50° C. and about 150° C., preferably under pressure and, if desired, in the presence of conventional catalysts or initiators such as sodium hydroxide, potassium hydroxide and the like; alkali metals such as sodium, potassium, calcium and the like.

The hydroxyl phosphorus compounds of the invention are useful for the preparation of polyurethane plastics which may be used for both sound and thermal insulation for gaskets, moldings, coatings for wood, metal and the like.

The invention also contemplates polyurethane plastics which are prepared by the reaction of the hydroxyl phosphorus compounds with organic polyisocyanates. The polyurethane plastics may be either porous or non-porous and for their production, any suitable organic polyisocyanate may be used such as, for example, aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate,
ethylidene diisocyanate,
propylene-1,2-diisocyanate,
cyclohexylene-1,2-diisocyanate,
m-phenylene diisocyanate,
2,4-toluylene diisocyanate,
2,6-toluylene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
p,p',p''-triphenylmethane triisocyanate,
1,5-naphthylene diisocyanate,
furfurylidene diisocyanate or
polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthylene diisocyanate, p,p',p''-triisocyanato phenyl phosphate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate. The isocyanates may be used in refined or crude form such as crude toluylene diisocyanates as are obtained by the phosgenation of a mixture of toluylene diamines or crude diphenyl methane isocyanates such as those obtained by the phosgenation of crude diphenyl methane diamine.

It is not necessary to use the hydroxyl phosphorus compounds alone. They may be used in conjunction with an active hydrogen containing compound containing active hydrogen containing groups as determined by the Zerewitinoff method, for example, polyhydric polyalkylene ethers, hydroxyl polyesters, polyhydric polythioethers and the like. Any suitable polyhydric polyalkylene ether may be used such as, for example, the condensation product of an alkylene oxide or of an alkylene oxide with a polyhydric alcohol as more particularly set forth below for preparation of polyesters. Hydroxyl polyesters suitable for mixture with the hydroxyl phosphorus compounds may be obtained from any suitable polycarboxylic acid reacted with any suitable polyhydric alcohol such as, for example, adipic acid, sebasic acid, succinic acid, terephthalic acid, and the like, reacted with such polyhydric alcohols as ethylene glycol, 1,3-propylene glycol, 1,4-butylene glycol, trimethylolpropane, glycerine, 1,2,6-hexanetriol and the like. Any suitable polyhydric polythioether may be used such as, for example, the condensation product of thiodiglycol or the reaction product of a polyhydric alcohol with any other suitable thioether glycol. Suitable thioether glycols are disclosed in U.S. Patents 2,862,972 and 2,900,368.

The production of cellular polyurethane plastics in accordance with the invention is carried out by combining the organic polyisocyanate with the hydroxyl phosphorus compound in the presence of a blowing agent. Suitable machinery for carrying out the process is disclosed in Reissue Patent 24,514. Any suitable blowing agent may be used such as, for example, a halohydrocarbon such as, for example, dichlorodifluoromethane, trichlorofluoromethane or water may be included in the reaction mixture together with sufficient excess of organic polyisocyanate to bring about a reaction to produce carbon dioxide which will act as a blowing agent to produce a cellular polyurethane plastic. It is possible to react the components in a single stage wherein the organic polyisocyanate and hydroxyl phosphorus compound are intimately mixed and allowed to react to produce a cellular polyurethane plastic or a prepolymer may be prepared by first reacting an excess of the organic polyisocyanate with the hydroxyl phosphorus compound and then combining this product with water or additional cross-linking agent in the presence of a blowing agent to produce a cellular polyurethane plastic. It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene copolymer. The latter type of silicone oil is disclosed in U.S. Patent 2,834,748. Were polyhydric polyalkylene ethers are included in the reaction mixture to prepare a cellular polyurethane plastic, it is preferred to employ a silicone oil of the above patent within the scope of the formula $$R'Si \begin{matrix} O(R_2SiO)_p(C_nH_{2n}O)_zR'' \\ -O(R_2SiO)_q(C_nH_{2n}O)_zR'' \\ O(R_2SiO)_r(C_nH_{2n}O)_zR'' \end{matrix}$$

wherein R, R' and R'' are alkyl radicals having 1 to 4 carbon atoms, $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

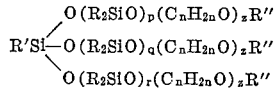

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, tertiary amines, such as, for example, triethylene diamine-N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are for example tin compounds such as stannous chloride, tin salts of carboxylic acids, such as dibutyl tin di-2-ethyl hexoate, tin alcoholates such as stannous octoate, as well as other organo metallic compounds such as are disclosed in U.S. Patent 2,846,408 and in copending application Serial No. 835,450.

Non-porous polyurethane plastics which may be castings or moldings are prepared by reacting an excess of the organic polyisocyanate with the hydroxyl phosphorus compound and an organic cross-linking agent such as a polyhydric alcohol, a polyamine or the like under substantially anhydrous conditions. Any suitable organic cross-linking agent may be used such as, for example, ethylene glycol, 1,3-propylene glycol, 1,4-butylene glycol, 1,3-butylene glycol, trimethylolpropane, ethylene diamine, ethanol amine and the like, as well as mixtures of these.

Coating compositions particularly adapted to coating wood, metal, rubber and the like may be prepared by reacting an organic polyisocyanate with the hydroxyl phosphorus compounds of the invention in an inert organic solvent therefor. Any suitable inert organic solvent may be used such as, for example, xylene, toluene, diethyl ether of ethylene glycol, ethyl acetate of ethylene glycol, monethyl ether acetate and the like. Any suitable substrate may be coated with the coating compositions of the invention including wood, paper, porous plastics, such as, for example, sponge rubber, cellular polyurethane plastics, foamed polystyrene and the like. The coating compositions may contain any suitable pigment such as, for example, iron oxide, carbon black, titanium dioxide, zinc oxide, chrome green, lithol red and the like.

The invention is further illustrated by the following examples in which the parts are by weight unless otherwise indicated.

*Example 1*

(a) About 153.5 parts of phosphorus oxychloride, $POCl_3$, are introduced dropwise into a solution of about 411 parts of N-β-hydroxyethyl aniline in about 2000 parts by volume of toluene at about 20–30° C. while stirring vigorously. The suspension which forms is stirred for approximately another 30 minutes, and then saturated at about 20° C. with substantially anhydrous ammonia gas and then heated to about 50° C. The ammonium chloride which is separate by filtration at about 60° C. and the clear yellow solution is concentrated by evaporation in vacuo. About 458 parts of a yellow oil remain in the residue. After adding a catalytic quantity of sodium tertiary butylate, about 115 parts of ethylene oxide are introduced into this oil at about 60° C. As reaction product, there are obtained about 573 parts of the desired phosphorus-containing polyhydroxyl compound in the form of a light brown clear oil with the OH-number of about 403.

(b) About 50 parts of the polyhydroxyl compound prepared according to (a) are mixed with about 50 parts of a polyester with an OH-number of about 370, prepared from adipic acid, phthalic acid anhydride, oleic acid and trimethylol propane. About 1 part of permethylated aminoethyl piperazine, about 0.5 part of polysiloxanecopolymer having the formulation

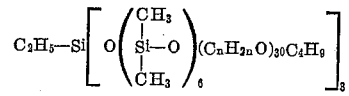

wherein $(C_nH_{2n}O)$ is a mixed polyoxyethylene and oxypropylene block copolymer containing about 17 oxyethylene units and about 13 oxypropylene units and about 6 parts of sodium-castor oil sulphate (about 50% water) are added to this mixture. After about 146 parts of 4,4'-diphenyl methane diisocyanate have been incorporated by stirring, the mixture is introduced into molds, in which it rises to form a difficultly inflammable hard foam, which has the following physical properties:

| | |
|---|---|
| Density _____kg./m.³__ | 41 |
| Compressive strength _____kg./cm.²__ | 2.5 |
| Impact toughness _____kg./cm__ | 0.2 |
| Water adsorption _____percent__ | 2.5 |
| Hot-bending strength _____° C__ | 128 |

*Example 2*

About 50 parts of the polyhydroxyl compound (OH-number about 403) prepared according to Example 1(a) are mixed with about 50 parts of the polyester used in Example 1(b). The activator mixture contains about 1 part of premethylated amino ethyl piperazine and about 0.5 part of polysiloxane copolymer used in Example 1(b). With addition of about 30 parts of trichloro-monofluoro-methane and about 97 parts of 4,4'-diphenyl methane di-isocyanate, the mixture is foamed. A difficultly inflammable hard foam is obtained, which has the following mechanical properties:

| | |
|---|---|
| Density _____kg./m.³__ | 37 |
| Compressive strength _____kg./cm.²__ | 1.8 |
| Impact toughness _____kg./cm__ | 0.2 |
| Water adsorption _____percent__ | 2.5 |
| Hot-bending strength _____° C__ | 102 |

*Example 3*

(a) About 411 parts of beta-hydroxyethyl aniline are reacted with about 153.5 parts of phosphorus oxychloride, POCl₃, in the manner described in Example 1(a). The yellow oil which is formed (about 458 parts) is mixed with about 10 parts of water and then reacted at about 50–60° C. with about 25 parts of ethylene oxide. The water previously added is then distilled off again in vacuo. In the residue, there remains about 483 parts of the desired phosphorus-containing polyhydroxyl compound as a brown clear oil with an OH-number of about 455.

(b) About 50 parts of the polyhydroxyl compound (OH-number about 455) prepared according to Example 3(a) are mixed with about 50 parts of a propoxylated trimethylol propane, about 2 parts of permethylated amino ethyl piperazine, about 0.3 part of the polysiloxane copolymer used in Example 1 and about 6 parts of sodium-castor oil sulphate (about 50% water). The mixture is foamed by addition of about 158 parts of 4,4'-diphenyl methane diisocyanate. A flame-resistant hard foam is obtained, which has the following mechanical properties:

| | |
|---|---|
| Density _____kg./m.³__ | 39 |
| Compressive strength _____kg./cm.²__ | 1.4 |
| Impact toughness _____kg./cm.__ | 0.1 |
| Water adsorption _____percent__ | 2.8 |
| Hot-bending strength _____° C__ | 122 |

*Example 4*

About 50 parts of the polyhydroxyl compound (OH-number about 403) prepared according to Example 1(a) are mixed with about 50 parts of a polyester prepared from adipic acid, diethylene glycol and trimethylol propane (OH-number 56). The mixture is dissolved in 200 parts of the solvent mixture of equal parts of ethyl acetate, butyl acetate and glycolmonomethylether acetate. 1.5 parts of a polyvinyl formal dissolved in ethyl acetate are added to the solution as flowing agent. Then 110 parts of a 75 percent ethyl actate solution of a triisocyanate prepared from 1 mol of trimethylol propane and 3 mols of toluylene diisocyanate are added. The mixture is well stirred and then sprayed with a spray gun onto a cleaned metal surface. The coating is dried for six days at room temperature. A lustrous surface is obtained with high resistance against scratching and solvents and which cannot be inflamed by means of a Bunsen burner. Instead of drying the coating at room temperature it is also possible to stove the lacquer for one hour at 100° C.

*Example 5*

About 100 parts of the polyhydroxyl compound (OH-number 403) prepared according to Example 1(a) are intimately mixed with a solution of 1.5 parts of permethylated aminoethylpiperazine, 1.5 parts of permethylated diethylentriamine, 0.2 part of dibutyltindilaurate and 6 parts of a sodium salt of a sulfonated caster oil (water content 50%). The mixture has then been added to 149 parts of 4,4'-diphenyl methane diisocyanate (90% purity). A stiff, non-inflammable rigid foam is obtained having the following properties:

| | |
|---|---|
| Density _____kg./m.³__ | 38 |
| Compressive strength _____kg./cm.²__ | 1.7 |
| Impact toughness _____kg./cm__ | 0.2 |
| Hot-bending strength _____° C__ | 127 |
| Water adsorption _____percent__ | 2.7 |

It is to be understod that the foregoing working examples are given for the purpose of illustration and that any other suitable phosphohalide, N-hydroxy alkyl aryl amine, alkylene oxide, organic polyisocyanate, acid binding agent, catalyst or the like could have been used in the working examples provided that the teachings of the foregoing disclosure are followed.

Although the invention has been described in considerable detail, it is to be understood that such detail is solely for the purpose of illustration and that many variations can be made by those skilled in the art without departing from the spirit and scope of the invention except as set forth in the claims.

What is claimed is:

1. A polyurethane plastic prepared by a process which comprises reacting an organic polyisocyanate with an hydroxyl phosphorus compound prepared by a process which comprises reacting a secondary N-hydroxy alkyl aryl amine having the formula Ar—NH—R—OH wherein Ar is an aromatic radical and R is an alkylene radical with a phosphohalide in the presence of an acid binding agent at a temperature within the range of about 20 to about 150° C and in such proportions that there is one hydroxyl group of the N-hydroxy alkyl aryl amine for each phosphorus to halogen bond of the phosphohalide and reacting the resulting product with an alkylene oxide to prepare an hydroxyl phosphorus compound having a molecular weight of from about 400 to about 10,000.

2. A cellular polyurethane plastic prepared by a process which comprises reacting, in the presence of a blowing agent, an organic polyisocyanate with an hydroxyl phosphorus compound prepared by a process which comprises reacting a secondary N-hydroxyl alkyl aryl amine having the formula Ar—NH—R—OH wherein Ar is an aromatic radical and R is an alkylene radical with a phosphohalide in the presence of an acid binding agent at a temperature within the range of about 20 to about 150° C. and in such proportion that there is one hydroxyl group of the N-hydroxyl alkyl aryl amine for each phosphorus to halogen bond of the phosphohalide and reacting the resulting product with an alkylene oxide to prepare an hydroxyl phosphorus compound having a molecular weight of from about 400 to about 10,000.

3. The polyurethane plastic of claim 1 wherein Ar is an aromatic radical having 1 or 2 benzene rings and R is an alkylene radical having 2 or 3 carbon atoms.

4. The polyurethane plastic of claim 1 wherein the N-hydroxy alkyl aryl amine is N-beta-hydroxy ethyl aniline and said phosphohalide is POCl₃.

5. A cellular polyurethane plastic prepared by a process which comprises reacting in the presence of a blowing agent, an organic polyisocyanate with a mixture of an organic compound containing active hydrogen containing groups as determined by the Zerewitinoff method and an hydroxyl phosphorus compound prepared by a process which comprises reacting a second N-hydroxyl alkyl aryl amine having the formula Ar—NH—R—OH wherein Ar is an aromatic radical and R is an alkylene radical with a phosphohalide in the presence of an acid binding agent at a temperature within the range of about 20 to about 150° C. and in such proportions that there is one hydroxyl group of the N-hydroxy alkyl aryl amine for each phosphorus to halogen bond of the phosphohalide and reacting the resulting product with an alkylene oxide to prepare an hydroxy phosphorus compound having a molecular weight of from about 400 to about 10,0000.

References Cited by the Examiner
UNITED STATES PATENTS

| | | | |
|---|---|---|---|
| 2,610,978 | 9/1952 | Lanham | 260—461 |
| 2,956,031 | 10/1960 | Khawam | 260—2.5 |
| 2,995,596 | 8/1961 | Debo | 260—461 |
| 3,034,996 | 5/1962 | Kaplan | 260—2.5 |
| 3,076,010 | 1/1963 | Beck et al. | 260—2.5 |
| 3,134,742 | 5/1964 | Wismer et al. | 260—2.5 |

LEON J. BERCOVITZ, *Primary Examiner.*

DONALD E. CZAJA, *Assistant Examiner.*